US008750304B2

(12) United States Patent
Ramasamy et al.

(10) Patent No.: US 8,750,304 B2
(45) Date of Patent: Jun. 10, 2014

(54) CONTROLLING DIRECTIONAL ASYMMETRICITY IN WIDE AREA NETWORKS

(75) Inventors: Arivu Mani Ramasamy, San Jose, CA (US); Zachary A. Seils, Austin, TX (US); Deepak S. Khanorkar, San Jose, CA (US); Giorgio Valentini, San Francisco, CA (US); Swaminathan Sankar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 555 days.

(21) Appl. No.: 12/761,511

(22) Filed: Apr. 16, 2010

(65) Prior Publication Data

US 2011/0255537 A1   Oct. 20, 2011

(51) Int. Cl.
*H04L 12/28* (2006.01)

(52) U.S. Cl.
USPC .......................................... 370/392; 370/389

(58) Field of Classification Search
None
See application file for complete search history.

(56) References Cited

U.S. PATENT DOCUMENTS

| | | | |
|---|---|---|---|
| 6,381,638 B1 * | 4/2002 | Mahler et al. | 709/220 |
| 6,674,744 B1 * | 1/2004 | Doshi et al. | 370/352 |
| 6,760,775 B1 * | 7/2004 | Anerousis et al. | 709/238 |
| 7,003,574 B1 * | 2/2006 | Bahl | 709/228 |
| 7,068,654 B1 * | 6/2006 | Joseph et al. | 370/392 |
| 7,110,833 B2 * | 9/2006 | Nagatsuka et al. | 700/17 |
| 7,876,710 B2 * | 1/2011 | Rustagi et al. | 370/254 |
| 8,112,530 B2 * | 2/2012 | El Mghazli et al. | 709/227 |
| 8,218,540 B1 * | 7/2012 | Busch et al. | 370/389 |
| 2004/0174816 A1 | 9/2004 | Stewart et al. | |
| 2008/0205445 A1 | 8/2008 | Kumar et al. | |
| 2011/0255537 A1 * | 10/2011 | Ramasamy et al. | 370/392 |

FOREIGN PATENT DOCUMENTS

WO    2010021577 A1    2/2010

OTHER PUBLICATIONS

PCT Invitation to Pay Additional Fees and Communication Relating to the Results of the Partial International Search, PCT/US2011/031222, Jul. 7, 2011, 5 pages.
International Preliminary Report on Patentability and Written Opinion in counterpart International Application No. PCT/US2011/031222, mailed Oct. 26, 2012.

* cited by examiner

*Primary Examiner* — Robert Wilson
(74) *Attorney, Agent, or Firm* — Edell, Shapiro & Finnan, LLC

(57) ABSTRACT

In one embodiment a method includes detecting, at a first Wide Area Network (WAN) device deployed at an edge of a WAN, a packet passing through the first WAN device and departing a node with which the first WAN device is associated for another node connected to the WAN, identifying, by the first WAN device, a network destination address to which the packet is addressed, obtaining from memory accessible to the first WAN device an identifier of another WAN device associated with the network destination address, and marking the packet with the identifier to generate a marked packet. The marked packet is then received by a WAN device, which detects the identifier, and passes the marked packet to the identified WAN device. In an embodiment, the WAN device associated with the network destination address is a WAN device that first detects a synchronization-acknowledgement (SYN-ACK) packet.

15 Claims, 5 Drawing Sheets

| IP HEADER | TCP HEADER | TCP OPTION FIELD = 200b |

*Fig. 3*

| SERVER IP | WAAS MODULE ID |
|---|---|
| 200.200.20.2 | 200a |
| 300.300.30.3 | 200b |

CONTROLLING DIRECTIONAL ASYMMETRICITY IN WIDE AREA NETWORKS

TECHNICAL FIELD

The present disclosure relates to network data communication, particularly over Wide Area Network infrastructures.

BACKGROUND

A Wide Area Network (WAN) is a computer network that covers a broad area, e.g., a network whose communications links cross metropolitan, regional, or national boundaries. This is in contrast to personal area networks (PANs), local area networks (LANs), campus area networks (CANs), or metropolitan area networks (MANs) which are usually limited to a room, building, campus or specific metropolitan area (e.g., a city), respectively.

WANs are often used to connect LANs and other types of networks together, so that users and computers in one location can communicate with users and computers in other locations. Many WANs are built for one particular organization and are private. Others, built by Internet service providers, provide connections from an organization's LAN to the Internet. WANs are often built using leased lines. At each end of the leased line, a router connects to the LAN on one side and to a hub within the WAN on the other. WANs can also be built using less costly circuit switching or packet switching methods. Network protocols such as the Transmission Control Protocol/Internet Protocol (TCP/IP) can provide transport and addressing functions within WANs.

BRIEF DESCRIPTION OF THE DRAWINGS

FIG. 3 shows a Transmission Control Protocol (TCP) Synchronization-Acknowledgement (SYN-ACK) packet including a WAAS module identifier in accordance with an embodiment.

FIG. 4 shows an example table used by a WAAS module to mark an outgoing TCP synchronization (SYN) packet in accordance with an embodiment.

DESCRIPTION OF EXAMPLE EMBODIMENTS

Overview

In one embodiment a method includes detecting a packet departing a node for another node in a Wide Area Network (WAN), identifying a network destination address to which the packet is addressed, obtaining from stored data, such as a table, an identifier of a WAN device associated with the network destination address, and marking the packet with the identifier to obtain a marked packet for delivery to the WAN. WAN devices are deployed at WAN edges. When a marked packet is received by a WAN device, the WAN device redirects the marked packet to the WAN device associated with the identifier as marked. In a particular implementation, the identified WAN device is the WAN device that first "sees," or detects, a synchronization-acknowledgement (SYN-ACK) packet transmitted via the WAN.

Example Embodiments

Figure 1:
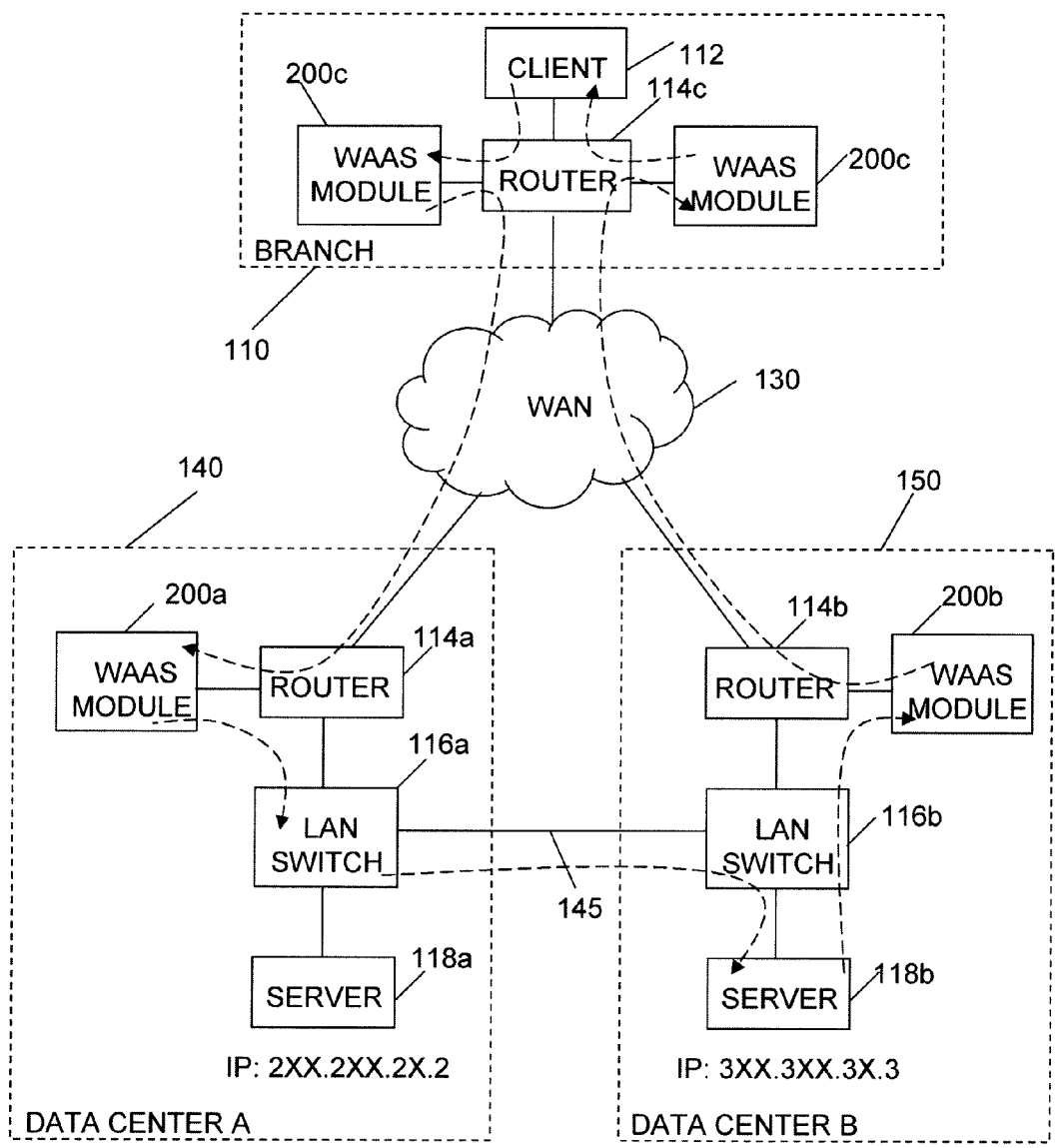
FIG. 1 shows an example WAN infrastructure including a Wide Area Application Service (WAAS) module in accordance with an embodiment.

FIG. 1 shows an example Wide Area Network (WAN) infrastructure including a WAN 130, a Branch Office 110 having therein a client 112, a router 114c and a Wide Area Application Service (WAAS) module 200c (shown as two separate blocks in the figure for purposes of explanation).

WAAS module 200c, as well as the other WAAS modules 200a, 200b described later herein, work together to accelerate WAN performance. WAAS modules may be deployed at the border or edge of, e.g., a WAN and local area networks (LANs), often logically close to a router, so that data passing, via a WAN, from one LAN towards another LAN or other node in a network, can be monitored and even processed in certain ways, including the ways described herein. By inspecting data flowing into the WAN, network managers can better coordinate traffic flow, especially at the application level. More specifically, WAAS modules, working in coordination with one another, can provide TCP flow optimization, data redundancy elimination, session-based compression services, protocol optimization, object caching, among other possible services.

Client 112 may be a computer or other electronic device that is configured to communicate electronically with other electronic devices, such as a server, via a communication protocol, such as Transmission Control Protocol/Internet Protocol (TCP/IP). Such communication may be established via WAN 130 to, e.g., Data Center A 140 and/or Data Center B 150. As shown in FIG. 1, Data Center A includes router 114a, WAAS module 200a, Local Area Network (LAN) Switch 116a, and Server 118a (Example IP address 2XX.2XX.2X.2). Likewise, Data Center B includes router 114b, WAAS module 200b, Local Area Network (LAN) Switch 116b, and Server 118b (IP address 3XX.3XX.3X.3). As mentioned, WAAS modules 200 are deployed at the edges of nodes so that packet traffic entering and leaving the node via the WAN can be inspected by the WAAS modules 200 and processed in desired ways.

In operation, Client 112 may desire to establish a connection, e.g., a TCP connection, with a server having a particular IP address. An IP address is a logical address, and thus the server associated with that IP address could, theoretically, be in any physical location. Client 112 need not know where the server is, nor does Client 112 have any need to know how packets associated with a given connection actually flow between Client 112 and, Data Centers 140, 150.

While Client 112 may not need to know how packets are routed or which elements of a network might peer with one another, this may be of interest to network administrators who may want to optimize or improve overall network control, operability or efficiency. One way to optimize WAN operations is to strive for symmetrical communication where both directions of, e.g., a TCP connection are seen by the same WAAS module (where, again, WAAS modules are deployed at an edge of each node (such as the edge of Data Center A 140 and Data Center B 150)). Symmetrical communication may be achieved when a routing policy of the underlying network infrastructure forwards traffic symmetrically. In these cases both directions of a TCP connection follow the same underlying network path. If the path in both directions is not the same, meeting the symmetrical goal becomes difficult. More specifically, in one possible scenario, connections may 'jump' between geographically separated data centers causing asymmetricity.

Referring again to FIG. 1, and to further explain instances of asymmetricity, remote Branch Office 110 is connected to Data Centers A and B 140, 150 via WAN 130. There are several connection flow patterns that can result from this topology:

1. Branch 110>DC A 140>DC A Server 118*a*>DC A 140>Branch 110. In this flow, data is passed from Branch Office 110 to Data Center A 140 and then to Server 118*a*. Response or reply data travels from Server 118*a* through Data Center A 140 and back to Branch Office 110.

2. Branch 110>DC B 150>DC B Server 118*b*>DC B 150>Branch 110. This flow is similar to flow of case (1) above, except communication occurs between Branch Office 110 and Server 118*b* in Data Center B 150.

3. Branch 110>DC A 140>DC B 150>DC B Server 118*b*>DC B 150>Branch 110. This flow involves both Data Center A 140 and Data Center B 150. More specifically, data intended for Data Center B 150, is actually routed first towards Data Center A 140. Reply or response data is communicated from Data Center B 150 to the Branch Office 110.

4. Branch 110>DC B 150>DC A 140>DC A Server 118*a*>DC A 140>Branch 110. Like the flow of case (3) above, data in this flow is passed through Data Center B on its way toward Data Center A 140.

FIG. 1 depicts the specific flow of case (3) and, in both cases (3) and (4), a connection request is routed via, e.g., IP, to one data center (Data Center B), even though the intended server actually resides in another data center (Data Center A). As a result, traffic flow is considered to be asymmetric. As also shown in FIG. 1, the WAAS modules 200*a*, 200*b*, 200*c* "see" the traffic flowing in the overall infrastructure since they are all deployed at the edges of the respective nodes, and, as will be explained in more detail below, can be used to enhance or optimize connections between nodes, such as Client 112 and Server 118*b* in Data Center B 150.

More specifically, in a TCP connection request, between, e.g., Client 112 and Server 118*b* (at example IP address 3XX.3XX.3X.3), Client 112 initiates the connection request by sending a synchronization (SYN) packet to the intended destination address. That SYN packet passes through and is thus "seen" or detected by WAAS module 200*c*. Although the SYN packet has a destination address associated with Data Center B 150, IP routing considerations could cause the SYN packet to be sent to Data Center A 140 where WAAS module 200*a* also "sees" the packet. The SYN packet is received by LAN Switch 116*a*, which realizes that the destination IP address in the SYN packet is 3XX.3XX.3X. As a result, LAN Switch 116*a* sends the SYN packet to Data Center B (over, e.g., "back haul" link 145 disposed between LAN switches 116*a*, 116*b*), at which Server 118*b* (having the intended IP address) resides. Of course, the use of a back haul line is but one example of an approach to implementing re-direction, and other approaches are possible.

Since Server 118*b* is the intended server or node, Server 118*b* generates and sends a synchronization-acknowledgement (SYN-ACK) packet directed to Client 112, in accordance with TCP. The SYN-ACK packet is seen by WAAS module 200*b* on its journey back to Client 112. As illustrated, routers 114*a*, 114*b*, and 114*c* enable routing of the packets into WAN 130. Further in accordance with TCP, Client 112 generates and sends an Acknowledgement (ACK) packet back to Server 118*b* in response to the SYN-ACK packet that it has received. The ACK packet would likely travel the same path that the SYN packet traveled (i.e., via Data Center A 140).

Considering the foregoing, the asymmetry lies in the fact that the SYN-ACK packet is received from a node (Data Center B 150) different from a node at which the SYN packet arrived (Data Center A 140). This asymmetry is not an optimal network state from the perspective of WAN transit devices, such as WAAS modules 200.

In an effort to detect and address this asymmetry (at the TCP, not IP level), WAAS module 200*b* in Data Center B is configured to add a TCP option in the SYN-ACK packet to signal WAAS module 200*a* at Client 112 in Branch Office 110 that it (i.e., WAAS module 200*b*) should be the device that optimizes connections destined to Server 118*b* in the future. This specially marked SYN-ACK packet arrives at WAAS module 200*a* at Branch 110, where it is cached for use in the future.

When a SYN (or other) packet for a subsequent connection to the same Server 118*b* is initiated by Client 112 (or any other client in remote branch 110), WAAS module 200*a* in remote branch 110 adds a TCP option to the SYN packet to indicate that the SYN packet should be forwarded to WAAS module 200*b* in Data Center B 150. Accordingly, when such a "marked" SYN packet is received by WAAS module 200*a* in Data Center A 140 (due to IP routing), WAAS module 200*a* sees or detects the option and redirects the SYN packet to WAAS module 200*b* in Data Center B 150 using, e.g., an IP routing technique such as Generic Routing Encapsulation (GRE) tunneling (and would likewise do so for all future packets for the connection). WAAS module 200*b* in Data Center B 150 thus receives the SYN packet, removes any tunneling (e.g., GRE) header information, and forwards the original SYN (or other) packet to Server 118*b*. Since Server 118*b* is the intended node, WAAS 200*b* also receives the responsive SYN-ACK packet, thus achieving the base requirement of symmetric flow handling (again, from the perspective of the WAAS modules 200; IP routing is not changed). It is noted that any WAAS module 200 in the network could perform re-direction. This is particularly beneficial since IP routing might change, but re-direction can still be achieved.

Figure 2:
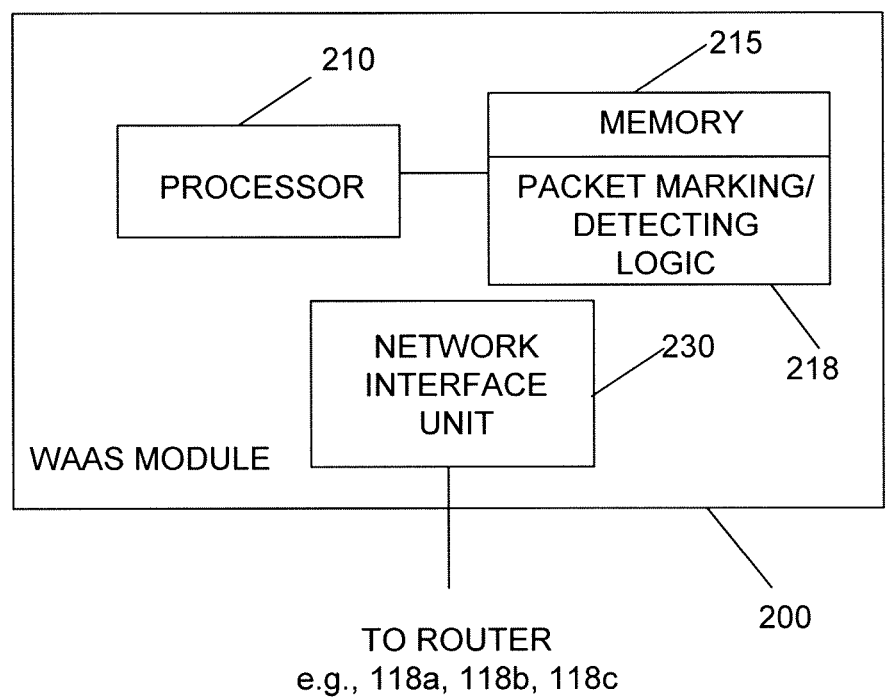
FIG. 2 shows an example implementation of a WAAS module in accordance with an embodiment.

FIG. 2 shows an example implementation of a WAAS module 200 that can be used for WAAS modules 200*a*, 200*b* or 200*c*. It is noted that WAAS module functionality may be implemented as one or more hardware components, one or more software components, or combinations thereof. More specifically, WAAS module 200 may be comprised of a programmable processor (microprocessor or microcontroller) or a fixed-logic processor 210. In the case of a programmable processor, any associated memory 215 may be of any type of tangible processor readable memory (e.g., random access, read-only, etc.) that is encoded with or stores instructions, such as packet marking/detecting logic 218. Alternatively, WAAS module 200 may be comprised of a fixed-logic processing device, such as an application specific integrated circuit (ASIC) or digital signal processor that is configured with firmware comprised of instructions or logic (e.g., packet marking/detecting logic 218) that cause the processor 210 to perform the functions described herein. Thus, WAAS module 200 may take any of a variety of forms, so as to be encoded in one or more tangible media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in a processor readable medium that is encoded with instructions for execution by a processor that, when executed by the processor, are operable to cause the processor to perform the functions described herein. To enable connectivity with network infrastructure, a network interface unit 230 may also be provided.

It is noted that the functionality described herein for a separate WAAS module 200 could also be implemented directly in a router, assuming the router is deployed at the edge of a node.

Referring still to FIG. 2, WAAS modules 200 include packet marking and detecting logic 218. The "marking" logic is employed during an original SYN-ACK transmission back to a node that sent a SYN packet as well as during subsequent transmissions of packets to a previously recorded destination node. The "detecting" logic is used by WAAS modules 200 to detect IP destination addresses in (SYN) packets and to redirect marked (SYN) packets towards a WAAS module identified in the TCP option field.

FIG. 3 shows a simplified TCP SYN-ACK packet including a WAAS identifier marked in an option field. In this case, the WAAS module ID is 200b, which corresponds to the first WAAS module that sees or detects the SYN-ACK packet sent by Server 118b. This same marking would be added by WAAS module 200a in Branch Office 110 when a subsequent (SYN) packet is sent to the same server 118b. FIG. 4 shows an example table (or, more generally, stored data) that can be maintained by WAAS module 200c (or any WAAS module) to mark outgoing packets (including a TCP SYN packet) in accordance with an embodiment. As shown, the IP address 3XX.3XX.3X.3 that is the IP address of Server 118b is associated with WAAS module 200b. Accordingly, when a SYN packet destined for IP address 3XX.3XX.3X.3 is seen by WAAS module 200c, it accesses its cached table (perhaps stored in memory 215) to determine whether the destination IP address of the TCP SYN packet is listed. If so, this means that a SYN-ACK packet has previously been received from that destination address. And, thus, in an effort to detect and address asymmetricity, WAAS module 200c marks the newly-outgoing SYN packet with the WAAS module ID of 200b.

Then, when that marked SYN packet is detected by WAAS module 200a in Data Center A 140 (assuming the SYN packet is routed towards Data Center A 140), WAAS module 200a can redirect the packet directly to WAAS 200b, in accordance with the option field of the TCP packet.

Figure 5:
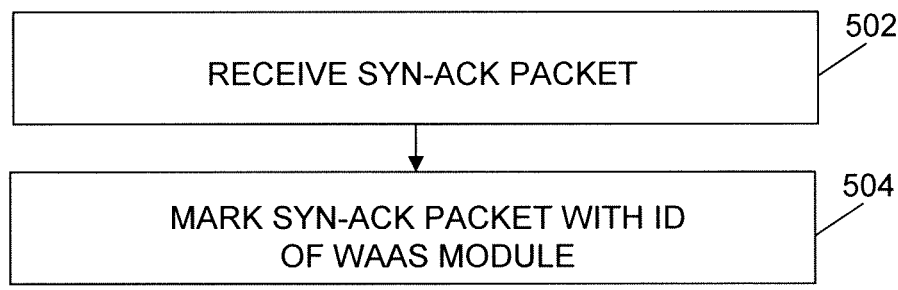
FIG. 5 shows an example sequence of steps for marking a SYN-ACK packet.

FIG. 5 shows an example sequence of steps for marking a SYN-ACK packet generated by a server, such as Server 118b. At step 502 a SYN-ACK packet is received, at e.g., a WAAS module at an edge of a network node, and at step 504 the SYN-ACK packet is marked with an identifier of, e.g., the WAAS module that is first to "see" the SYN-ACK packet. The packet is then passed to a router to be returned to the WAN for delivery to the device, e.g., computer, that sent a SYN packet to which the SYN-ACK packet is responsive.

Figure 6:
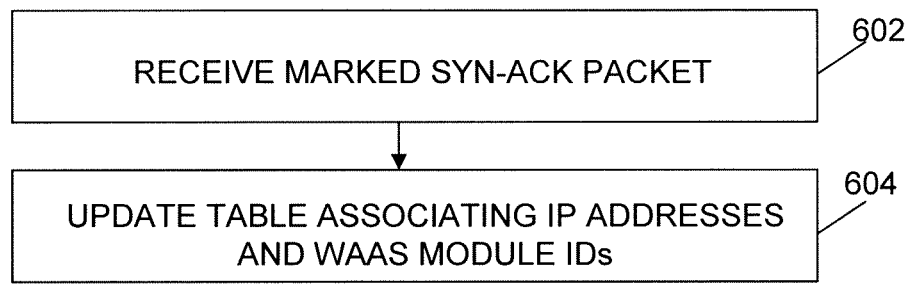
FIG. 6 shows an example sequence of steps for updating a table that is used by a WAAS module to mark a subsequent outgoing TCP SYN packet in accordance with an embodiment.

FIG. 6 shows an example sequence of steps for updating a table used by a WAAS module to mark a subsequent outgoing TCP SYN packet in accordance with an embodiment. As shown, at step 602 a marked SYN-ACK packet is received. Such a packet can be received by, e.g., WAAS module 200c in branch office 110. At step 604, the SYN-ACK packet is parsed to obtain the identifier of the WAAS module that marked that packet and then a table associating IP addresses and WAAS module identifiers (like that shown in FIG. 4) is updated. The SYN-ACK packet is then allowed to continue to its intended destination, namely, e.g., Client 112.

Figure 7:
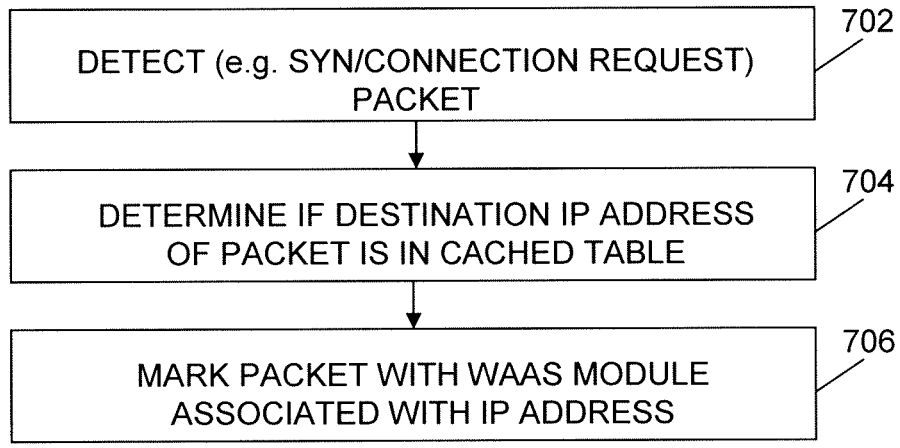
FIG. 7 shows an example sequence of steps for marking an outgoing TCP SYN packet in accordance with an embodiment.

FIG. 7 shows an example sequence of steps for marking an outgoing packet (including a TCP SYN packet) in accordance with an embodiment. At step 702, a connection request or SYN packet is detected at, e.g., a WAAS module. At step 704, the destination IP address of the SYN packet is obtained and compared to IP addresses stored in, e.g., a table associating IP addresses and WAAS modules. At step 706, assuming the destination IP address is listed in the table, the SYN packet is marked with the WAAS identifier associated with the destination IP address. The marked SYN packet may then be passed to a router for routing to the WAN. Those skilled in the art will appreciate that once a connection is established between nodes, the WAAS module continually marks subsequent outgoing packets involved in the session in this fashion, thereby increasing TCP-level connection efficiency.

Figure 8:
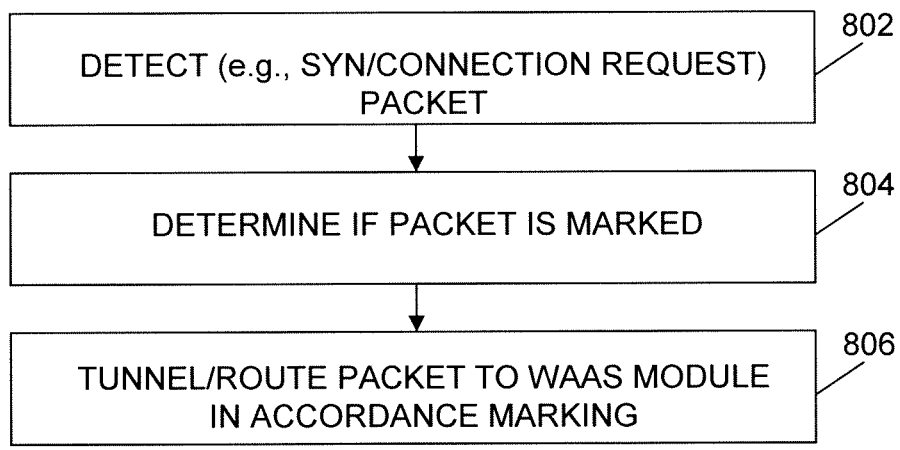
FIG. 8 shows an example sequence of steps for redirecting a TCP SYN packet from one WAAS module to another WAAS module in accordance with an embodiment.

FIG. 8 shows an example sequence of steps for redirecting a marked TCP SYN packet (as well as other packets so marked) from one WAAS module to another WAAS module in accordance with an embodiment. These series of steps would, in the embodiment shown in FIG. 1, be performed by WAAS module 200a. At step 802, a packet is detected or "seen." Then at step 804 it is determined if the packet is marked. Assuming the packet is marked with a WAAS module identifier, the packet is tunneled at step 806 to the WAAS module having that identifier. Tunneling could be by GRE as mentioned earlier, or via any other appropriate method.

The methodology described herein may accomplish several things. For instance, a WAAS module can see a TCP connection symmetrically thus possibly enabling improved WAN efficiency. In addition, the approach described herein can minimize or eliminate additional latency incurred due to path selection/forwarding. Further, network path affinity can be preserved for optimized connections.

The foregoing is made possible by enabling a WAAS module in, e.g., a remote branch office to determine which device in a remote data center should be its peer, and making a WAAS module that sees the SYN-ACK first (versus, e.g., seeing the SYN first) become the "owner" of the connection.

Thus, in embodiments described herein a remote branch WAAS module participates in identifying asymmetric traffic flows and determines, through interaction with a Data Center WAAS module, with which Data Center WAAS module it should peer to optimize a given connection. In addition, connection ownership for a Data Center WAAS module is determined by first receipt of the SYN-ACK packet for a connection, versus receipt of a SYN packet.

The example embodiments described herein can provide certain advantages. For example, the approach does not need control plane advertisements or queries between geographically disbursed WAAS modules. That is, the WAAS modules can leverage the TCP handshake and add options/marking to signal each other rather than communicating separately via a control plane.

Further, no extra latency is incurred for optimized connections, since choosing a connection owner in a Data Center based on SYN-ACK ensures that network path affinity is preserved between optimized and non-optimized connections.

Further still, network path affinity is preserved for optimized connections. This preserves the routing policy of the existing network infrastructure, which can simplify the complexity of the solution and operational support impact.

For connections that do not use the techniques described herein, i.e., connections that might be considered un-optimized (i.e., pass-through) connections, no additional latency may be incurred as those connections may simply be unaffected.

In addition, if/when an underlying routing topology changes, the WAAS modules automatically adjust to the new topology. That is, because the techniques leverage connection handshakes, each time a new connection is made, tables can be updated and subsequent packets can be marked accordingly.

Thus, the methodology described herein can involve a plurality of WAAS modules or WAN devices, where a WAN device is a device that, e.g., interconnects multiple LANs or other nodes so that communication from one LAN to another appears, from the perspective of a user, as though the communication occurs over a same LAN. In a simplified system, the approach can comprise three WAN devices, a first WAN device deployed in a first location, a second WAN device deployed in a second location, and a third WAN device deployed at a third location, wherein each of the WAN devices is logically located, respectively, at the edges of a WAN at the first, second and third locations such that data passing from/to a given location to/from the WAN passes through a WAN device prior to entering/leaving the WAN.

In operation, the first WAN device is configured to inspect a SYN-ACK packet received in response to a previously sent SYN packet. When the SYN-ACK packet includes an option marked with an identifier of, e.g., the third WAN device, the first WAN device updates a local memory location or table that stores a destination address (such as an IP address) of, e.g., a server to which the SYN packet was directed, along with the corresponding identifier of the third WAN device. The third WAN device is configured to mark SYN-ACK packet in a manner that is detectable by the first WAN device.

In subsequent operations, when the first WAN device detects a SYN packet destined for a destination address stored in its table, the first WAN device marks the SYN packet with the identifier of the third WAN device. When the so-marked SYN packet is received by, e.g., the second WAN device, the second WAN device is configured to detect the identifier of the third WAN device and further to re-direct the SYN packet directly to the third WAN device. The third WAN device is configured to then pass the SYN packet to, e.g., a server corresponding to the destination address of the SYN packet. Subsequent data (i.e., not associated with, e.g., a TCP handshake) is handled in a similar manner.

By having the WAN devices intercept communications in this fashion, it is possible to more effectively manage and optimize WAN topologies.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method, comprising:
    detecting, at a first Wide Area Network (WAN) device deployed at an edge of a WAN, a packet passing through the first WAN device, wherein the packet was sent from a node which is in communication with the WAN and wherein the packet has a first network destination address for another node connected to the WAN;
    identifying, by the first WAN device, the first network destination address to which the packet is addressed;
    obtaining from memory accessible to the first WAN device an identifier of a third WAN device associated with the first network destination address; and
    marking the packet with the identifier to generate a marked packet that identifies the third WAN device,
    wherein the marked packet is examined by a second WAN device and passed to a server associated with the third WAN device in accordance with the identifier, and
    wherein the identifier of the third WAN device is derived from a Transmission Control Protocol (TCP) synchronization-acknowledgement (SYN-ACK) detected by the first WAN device in response to a TCP SYN packet sent by a computing device associated with the first WAN device.

2. The method of claim 1, wherein marking comprises marking an option field in the TCP SYN packet.

3. The method of claim 1, further comprising detecting by the first WAN device a marked packet received from the WAN and updating the memory in accordance with information in the marked packet received via the WAN.

4. The method of claim 3, further comprising adding to the memory an Internet Protocol address and WAN device identifier that are associated with one another in the marked packet from the WAN.

5. The method of claim 1, further comprising passing the marked packet to a router that is in communication with the WAN.

6. A non-transitory processor readable medium encoded with instructions that, when executed by a processor, cause the processor to:
    detect, at a first Wide Area Network (WAN) device deployed at an edge of a WAN, a packet passing through the first WAN device wherein the packet was sent from a node which is in communication with the WAN and wherein the packet has a first network destination address for another node connected to the WAN;
    identify, by the first WAN device, the first network destination address to which the packet is addressed;
    obtain from memory accessible to the first WAN device an identifier of a third WAN device associated with the first network destination address; and
    mark the packet with the identifier to generate a marked packet that identifies the another third WAN device,
    wherein the marked packet is examined by a second WAN device and passed to a server associated with the third WAN device in accordance with the identifier, and
    wherein the identifier of the third WAN device is derived from a Transmission Control Protocol (TCP) synchronous-acknowledgement (SYN-ACK) packet detected by the first WAN device in response to a TCP SYN packet sent by a computing device associated with the first WAN device.

7. The processor readable medium of claim 6, further comprising instructions that, when executed by the processor, cause the processor to:
    receive a marked packet from the WAN; and
    update the memory in accordance with information in the marked packet received via the WAN.

8. The processor readable medium of claim 6, further comprising instructions that, when executed by the processor, cause the processor to:
    add to the memory an Internet Protocol address and WAN device identifier that are present in the marked packet received via the WAN.

9. The processor readable medium of claim 6, further comprising instructions that, when executed by the processor, cause the processor to:

pass the marked packet toward a router.

10. A method, comprising:

detecting a Transmission Control Protocol (TCP) synchronization-acknowledgement (SYN-ACK) packet being transmitted into a Wide Area Network (WAN);

marking an option field in the TCP SYN-ACK packet with an identifier of a WAN device that is first to detect the TCP SYN-ACK packet to generate a marked TCP SYN-ACK packet;

passing the marked TCP SYN-ACK packet to the WAN for transmission to a network node that transmitted a TCP SYN packet to which the SYN-ACK packet is responsive; and passing a data packet marked in a same manner as the TCP SYN-ACK packet to a server that generated the TCP SYN-ACK packet, wherein the TCP SYN-ACK packet is generated by a node of the WAN that is different from a node of the WAN that first received the TCP SYN packet.

11. The method of claim 10, further comprising:

removing encapsulation information from the data packet before passing the marked data packet to the server.

12. An apparatus, comprising:

a network interface; and a processor that is configured to:

detect, at a first Wide Area Network (WAN) device deployed at an edge of a WAN, a packet passing through the first WAN device wherein the packet was sent from a node which is in communication with the WAN and wherein the packet has a first network destination address for another node connected to the WAN;

identify, by the first WAN device, the first network destination address to which the packet is addressed;

obtain from memory accessible to the first WAN device an identifier of a third WAN device associated with the first network destination address; and mark the packet with the identifier to generate a marked packet that identifies the third WAN device, wherein the marked packet is examined by a second WAN device and passed to a server associated with the third WAN device in accordance with the identifier, and wherein the identifier of the third WAN device is derived from a Transmission Control Protocol (TCP) synchronous-acknowledgement (SYN-ACK) packet detected by the first WAN device in response to a TCP SYN packet sent by a computing device associated with the first WAN device.

13. The apparatus of claim 12, wherein the processor is further configured to:

receive a marked packet from the WAN; and update the memory in accordance with information in the marked packet received from the WAN.

14. The apparatus of claim 12, wherein the processor is further configured to:

add to the memory an Internet Protocol address and WAN device identifier that are present in the marked packet received from the WAN.

15. The apparatus of claim 12, wherein the processor is further configured to:

pass the marked packet toward a router.

* * * * *

UNITED STATES PATENT AND TRADEMARK OFFICE
CERTIFICATE OF CORRECTION

| | | |
|---|---|---|
| PATENT NO. | : 8,750,304 B2 | |
| APPLICATION NO. | : 12/761511 | |
| DATED | : June 10, 2014 | |
| INVENTOR(S) | : Arivu Mani Ramasamy et al. | |

It is certified that error appears in the above-identified patent and that said Letters Patent is hereby corrected as shown below:

In the Claims

Claim 6, column 8, line 46, delete the word "another".

Signed and Sealed this
Fifth Day of August, 2014

Michelle K. Lee
*Deputy Director of the United States Patent and Trademark Office*